United States Patent
Nakagawa et al.

(10) Patent No.: US 9,838,148 B2
(45) Date of Patent: Dec. 5, 2017

(54) OPTICAL RECEIVER AND SUPERIMPOSED SIGNAL DETECTING METHOD

(71) Applicant: FUJITSU LIMITED, Kawasaki-shi, Kanagawa (JP)

(72) Inventors: Goji Nakagawa, Sagamihara (JP); Tomohiro Yamauchi, Kawasaki (JP); Guoxiu Huang, Inagi (JP); Setsuo Yoshida, Inagi (JP); Shoichiro Oda, Fuchu (JP); Kyosuke Sone, Kawasaki (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/095,698

(22) Filed: Apr. 11, 2016

(65) Prior Publication Data

US 2016/0337070 A1 Nov. 17, 2016

(30) Foreign Application Priority Data

May 14, 2015 (JP) .................................. 2015-098816

(51) Int. Cl.
*H04J 14/02* (2006.01)
*H04B 10/077* (2013.01)
*H04B 10/25* (2013.01)

(52) U.S. Cl.
CPC ........ *H04J 14/0221* (2013.01); *H04B 10/077* (2013.01); *H04B 10/25* (2013.01); *H04J 14/0278* (2013.01)

(58) Field of Classification Search
None
See application file for complete search history.

(56) References Cited

U.S. PATENT DOCUMENTS

2009/0196603 A1 8/2009 Zhou et al.
2009/0232518 A1 9/2009 Caton et al.
(Continued)

FOREIGN PATENT DOCUMENTS

| EP | 2760147 A1 | 7/2014 |
|---|---|---|
| JP | 2013-009238 | 1/2013 |
| JP | 2013-201495 | 10/2013 |

OTHER PUBLICATIONS

EESR—The Extended European Search Report dated Oct. 18, 2016 from corresponding to European Patent Application No. 16165287.0.
(Continued)

*Primary Examiner* — Darren E Wolf
(74) *Attorney, Agent, or Firm* — Fujitsu Patent Center

(57) ABSTRACT

An optical receiver includes: a tunable filter configured to partially transmit a wavelength-multiplexed optical-signal including a first optical-signal having a first wavelength, a second optical-signal having a second wavelength, and a third optical-signal having a third wavelength, with a frequency-modulated signal superimposed on each of the first to third optical-signals; a photo detector configured to detect an optical-power of the wavelength-multiplexed optical-signal transmitted through the tunable filter; and a superimposed signal detector configured to detect the frequency-modulated signal superimposed on the first optical-signal, based on an amplitude-modulated signal according to a variation in the optical-power on a first filter setting where both of the first optical-signal and the second optical-signal transmit through the tunable filter, and an amplitude-modulated signal according to a variation in the optical-power on a second filter setting where both of the first optical-signal and the third optical-signal transmit through the tunable filter.

5 Claims, 11 Drawing Sheets

(56) References Cited

U.S. PATENT DOCUMENTS

2012/0328297 A1    12/2012   Hoshida
2013/0251365 A1     9/2013   Sone et al.
2015/0050018 A1     2/2015   Hironishi et al.

OTHER PUBLICATIONS

Ji, H.C., et al., "Optical performance monitoring techniques based on pilot tones for WDM network applications", Journal of Optical Networking, Optical Society of America, vol. 3, No. 7, Jul. 1, 2004, pp. 510-533, XP009130098. Cited in EESR dated Oct. 18, 2016 corresponding to EP Patent Application No. 16165287.0.

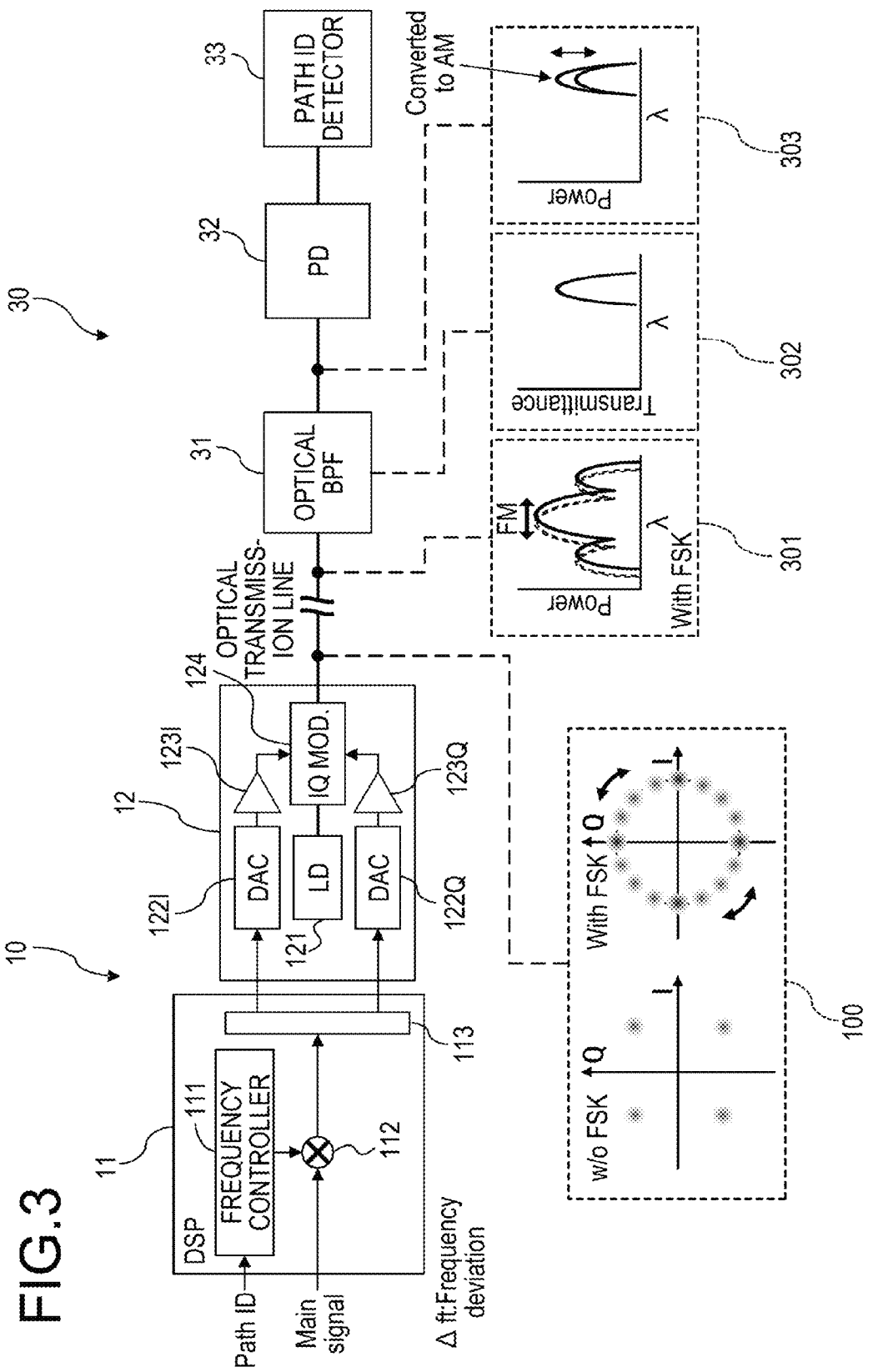

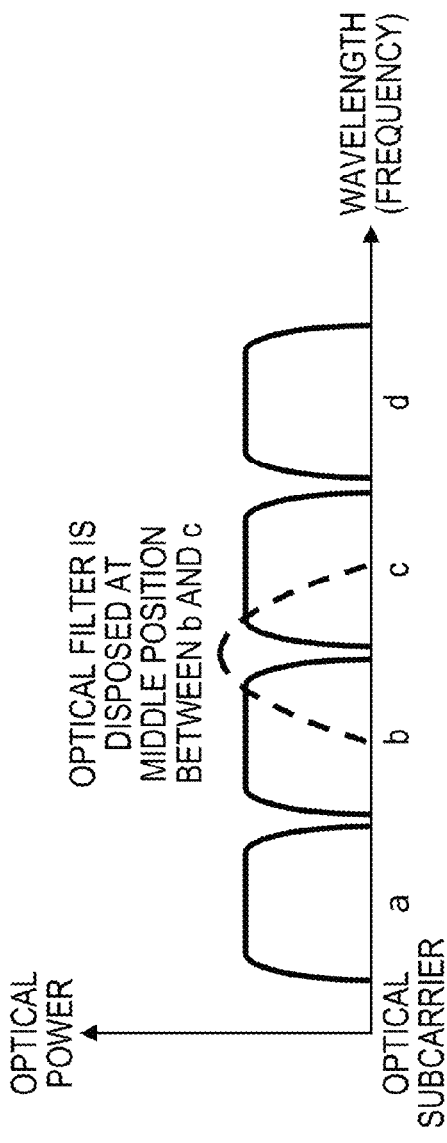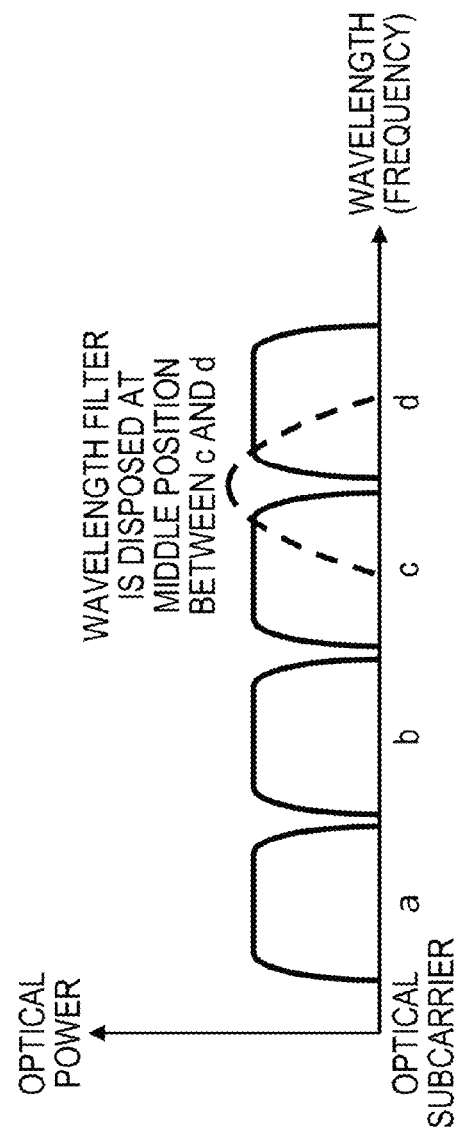
FIG.6A
FIG.6B

OPTICAL RECEIVER AND SUPERIMPOSED SIGNAL DETECTING METHOD

CROSS-REFERENCE TO RELATED APPLICATION

This application is based upon and claims the benefit of priority from the prior Japanese Patent Application No. 2015-098816, filed on May 14, 2015, the entire contents of which are incorporated herein by reference.

FIELD

The embodiments discussed herein are related to an optical receiver and a superimposed signal detecting method.

BACKGROUND

As one of optical communication techniques, there is a technique for superimposing a signal, which is different from a main optical signal, on the main optical signal by means of a frequency modulation. For example, a signal associated with a monitoring or a control of an optical transmission system may be superimposed on the main optical signal by means of frequency modulation.

Related techniques are disclosed in, for example, Japanese Laid-Open Patent Publication No. 2013-009238, and Japanese Laid-Open Patent Publication No. 2013-201495.

SUMMARY

According to an aspect of the invention, an optical receiver includes: a tunable filter configured to partially transmit a wavelength-multiplexed optical signal including a first optical signal having a first wavelength, a second optical signal having a second wavelength adjacent to a short wavelength side of the first wavelength, and a third optical signal having a third wavelength adjacent to a long wavelength side of the first wavelength, with a frequency-modulated signal superimposed on each of the first to third optical signals; a photo detector configured to detect an optical power of the wavelength-multiplexed optical signal transmitted through the tunable filter; and a superimposed signal detector configured to detect the frequency-modulated signal superimposed on the first optical signal, based on an amplitude-modulated signal according to a variation in the optical power detected in the photo detector on a first filter setting where both of the first optical signal and the second optical signal transmit through the tunable filter, and an amplitude-modulated signal according to a variation in the optical power detected in the photo detector on a second filter setting where both of the first optical signal and the third optical signal transmit through the tunable filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram illustrating an example of the configuration of an optical transmitter capable of superimposing an optical label on a main optical signal;

FIGS. 6A and 6B are schematic views illustrating an example of setting of the transmission center frequency of a tunable filter illustrated in FIG. 5;

DESCRIPTION OF EMBODIMENTS

Figure 1:
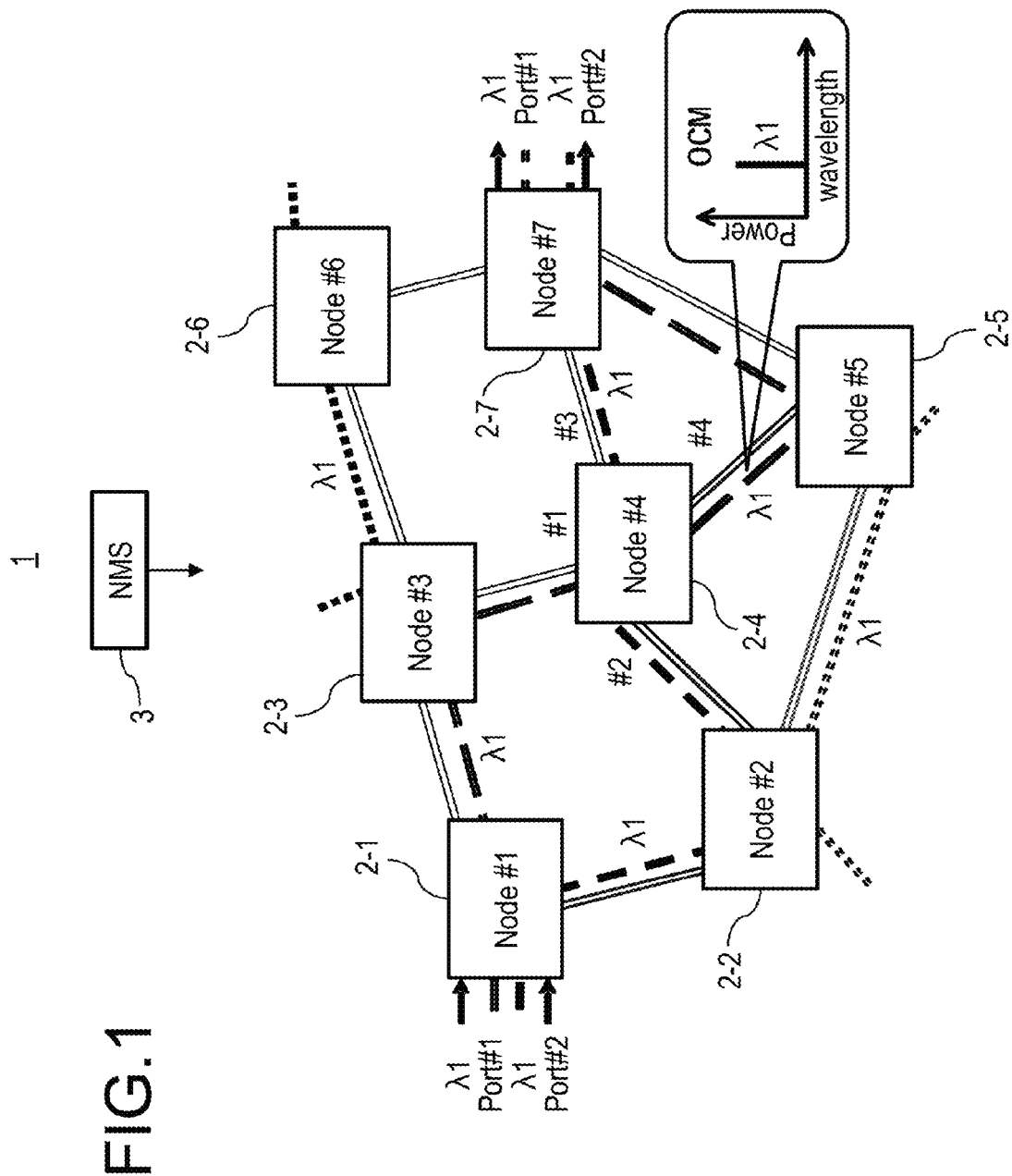
FIG. 1 is a block diagram illustrating an example of the configuration of an optical transmission system according to one embodiment.

In an optical transmission system, when a wavelength division multiplex) (WDM) light obtained by wavelength-multiplexing main optical signals having different wavelengths is to be transmitted, superimposed signals may be respectively superimposed on the main optical signal light having the plurality of wavelengths by means of frequency modulation.

In this case, there may be a crosstalk between the superimposed signals respectively superimposed on the main optical signal light having the plurality of wavelengths. There is, therefore, a possibility that this crosstalk deteriorates the reception characteristic (which may be also referred to as "reception quality") of the superimposed signals.

Hereinafter, embodiments of an optical receiver capable of improving the reception quality of a signal superimposed on each of optical signals having different wavelengths by means of frequency modulation and a superimposed signal detecting method will be described with reference to the drawings. However, the following embodiments are merely illustrative and are not intended to exclude other various modifications and techniques particularly unspecified herein. The following various illustrative aspects may be practiced in proper combinations. Throughout the drawings used to describe the following embodiments, the same elements and portions are denoted by the same reference numerals unless otherwise defined.

FIG. 1 is a block diagram illustrating an example of the configuration of an optical transmission system according to one embodiment. The term "optical transmission system" used herein may be called a "photonic network." The optical transmission system 1 illustrated in FIG. 1 may include a plurality of optical transmission apparatuses 2-1 to 2-N (#1 to #N) (N is an integer of 2 or more).

The term "optical transmission apparatus" used herein may be called a "node" or a "station." A node 2-*i* (i is an integer of 1 or more) may be simply referred to a "node 2" when one node needs not be distinguished from another.

The nodes 2 may be interconnected in optical communication by means of an optical transmission line. The optical transmission line may be using an optical fiber. The optical communication through the optical transmission line may be either a uni-directional or a bi-directional.

A node 2 may be either a WDM node capable of transmitting WDM light, or ROADM capable of adding and dropping optical signals in the unit of wavelength. In addition, the node 2 may be WXC capable of switching degrees of optical signals in the unit of wavelength.

The term "wavelength" may be referred to a "channel." A "wavelength" included in WDM light may be referred to as a "sub-channel" or a "sub-carrier," for the sake of convenience.

The term "WDM" is an abbreviation of "Wavelength Division Multiplex." The term "ROADM" is an abbreviation of "Reconfigurable Optical Add/Drop Multiplex."

The term "WXC" is an abbreviation of "Wavelength Cross Connect." The "WXC" may be referred to as a photonic cross connect (PXC).

A ROADM2 may be referred to as a "CDCG-ROADM." The term "CDCG" is an abbreviation of "Color-less, Direction-less, Contention-less and Grid-less."

Because of "CDCG," with respect to setting of a wavelength path between nodes 2, a CDCG-ROADM2 has no wavelength-dependency, no degree-dependency, no wavelength collision, and no restriction by wavelength space and bandwidth. In addition, because of "Reconfigurable," the CDCG-ROADM2 can have a flexibly-changeable node configuration.

Therefore, with the CDCG-ROADM2, a flexible path may be set for a connection request from a user (which may be referred to as an "operator") and the data rate and network operability may be increased, thereby reducing the operational costs.

A photonic network 1 (which may be simply referred to as a "network 1") in which the CDCG-ROADM2 is applied to each node 2-*i* facilitates unlimited optical path setting and allows the same wavelength to be allocated for a plurality of different optical paths.

In the example of FIG. 1, optical paths of the same wavelength λ1 are set for paths (which may be referred to as "spans") except for a path between a node #6 and a node #7. The term "optical path" used herein may be referred to as a "wavelength path."

The facilitation of unlimited optical path setting makes the monitoring of the optical paths important. An optical channel monitor (OCM) may be used to monitor the optical paths. For example, one or more OCMs may be provided in the node 2.

However, the OCMs cannot identify different optical paths allocated with the same wavelength since the OCMs can only monitor the optical power of the wavelengths.

Therefore, for example, it is difficult to monitor different optical paths having the same wavelength allocated for different optical fiber transmission lines. The monitoring of optical paths may be referred to as a "wavelength path trace."

As one of methods capable of providing a wavelength path trace of different optical paths having the same wavelength, there is a method for superimposing information which identifies the optical paths. The optical path-identifiable information may be referred to as a "path identifier (ID)" or "optical label."

In addition, a signal indicating a path ID may be referred to as a "wavelength path trace signal" or simply a "path trace signal." The "path trace signal" may be understood as one example of a signal for checking the conductivity of an optical path. The "path trace signal" may be referred to as a "superimposed signal" or may be referred to as a "sub-signal" as opposed to a main signal.

The "superimposed signal" or "sub-signal" may be understood as one example of a "supervisory (SV) signal." A signal (or information) which may be superimposed on an optical signal is not limited to the path trace signal. Any control signal or notification signal different from the man signal may be superimposed on the optical signal. As an example, the superimposed signal may be superimposed on the optical signal by means of a frequency modulation (FSK: frequency shift keying).

Figure 2:
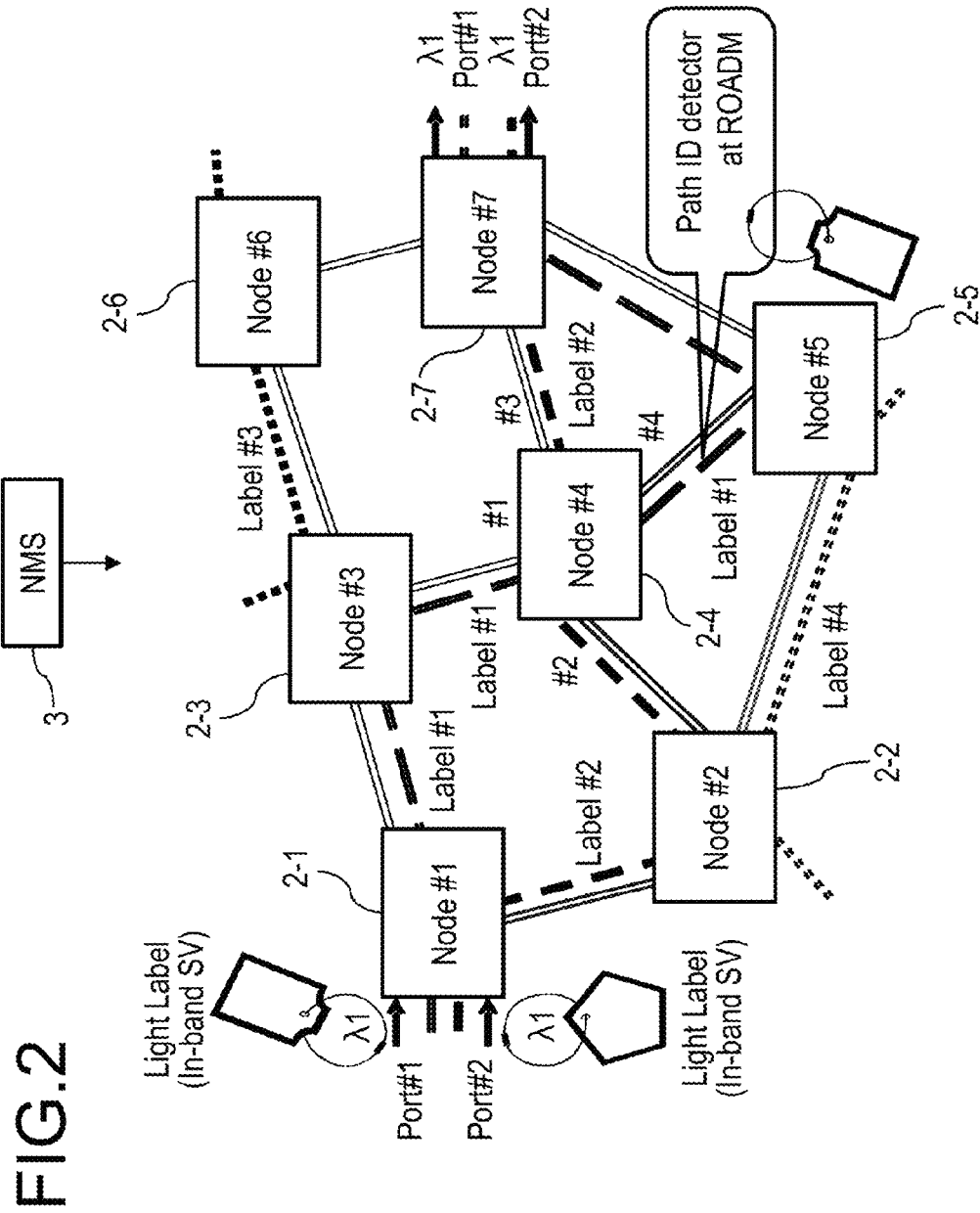
FIG. 2 is a block diagram for explaining one example of a wavelength path trace technique in the optical transmission system illustrated in FIG. 1.

As illustrated in FIG. 2, for example, a first optical label #1 may be superimposed on a main optical signal of an optical path of a wavelength λ1 which is routed through nodes #1-#3-#4-#5-#7. In addition, a second optical label #2 may be superimposed on a main optical signal of an optical path of a wavelength λ2 which is routed through nodes #1-#2-#4-#7.

Further, a third optical label #3 may be superimposed on a main optical signal of an optical path of a wavelength λ1 which is routed through nodes #3-#6, and a fourth optical label #4 may be superimposed on a main optical signal of an optical path of a wavelength λ1 which is routed through nodes #2-#5.

Thus, when optical labels are superimposed on main optical signals for transmission, without converting all of the received main optical signals into electrical signals and terminating these electrical signals, each node 2 can detect the optical labels by detecting signal components superimposed on the main optical signals.

In addition, for example, the setting of optical paths and the setting of optical labels may be performed by a network management system (NMS) 3 capable of intensively managing and controlling the overall operation of the network 1. The NMS 3 may be referred to as an operating system (OPS) 3.

FIG. 3 illustrates an example of the configuration of an optical transmitter capable of superimposing a light label on a main optical signal and an optical receiver capable of detecting the light label superimposed on the main optical signal. The optical transmitter may be referred to as an "optical transmitting device." The optical receiver may be referred to as an "optical receiving device."

The optical transmitter 10 illustrated in FIG. 3 may include, for example, a digital signal processor (DSP) 11 and an optical transmission module 12.

The DSP 11 superimposes a path ID on main signal data through a digital signal processing. For example, the superimposition of the path ID may be implemented by controlling a carrier frequency of a main optical signal.

The control of the carrier frequency of the main optical signal may be understood to correspond to rotating a main signal constellation in a complex plane (IQ plane), as illustrated with a dotted frame 100 in FIG. 3. A rotational speed of the main signal constellation corresponds to a frequency deviation of FSK (Frequency Shift Keying).

The digital main signal data on which the path ID is superimposed by means of FSK is used in a driving signal of an optical modulator (MOD) 124 in the optical transmission module 12.

For example, in the DSP 11, the digital main signal data is separated into an in-phase component (I component) and a quadrature component (Q component) in the complex plane, which are respectively input to a DAC (Digital-Analog Converter) 122I and a DAC 122Q included in the optical transmission module 12. The separation of digital main signal data into I component and Q component may be implemented by an IQ separator 113 according to the digital signal processing.

For example, one DAC 122I corresponds to an I component signal of the digital main signal data, and the other DAC 122Q corresponds to a Q component signal of the digital main signal data.

The DAC 122I converts the digital I component signal into an analog I component signal, and the DAC 122Q converts the digital Q component signal into an analog Q component signal.

The analog I component signal and the analog Q component signal are respectively amplified by driver amplifiers 123I and 123Q into driving signals having the amplitude appropriate to drive the optical modulator 124, which are then applied to a driving electrode (not illustrated) of the optical modulator 124.

The optical modulator 124 modulates the output light of a light source 121 according to the driving signals fed from the driver amplifiers 123I and 123Q. As a result, a modulated optical signal is obtained where a path ID is superimposed on a main optical signal as an FSK signal. The optical modulator 124 may be referred to as an "IQ modulator 124."

Here, an electric field of a main optical signal is represented by s(t) and the maximum frequency deviation of an FSK signal superimposed on the main optical signal is represented by Δft. Further, a waveform of the FSK signal is represented by a time function m(t) taking a value in a range of "−1 to +1" according to a temporal variation.

At this time, a main optical signal s'(t) on which the FSK signal is superimposed may be represented by the following Equation (1)

$$s'(t)=s(t)\exp(2\pi j\Delta ft \cdot m(t)) \quad (1)$$

The operation of Equation (1) is implemented by a frequency controller 111 and a phase rotator 112 according to the digital signal processing. The frequency controller 111 may be also referred to as a "phase rotation controller 111." The phase rotator 112 may be a multiplier.

The frequency controller (phase rotation controller) 111 applies an amount of phase rotation of the main signal data which is based on the path ID to the phase rotator 112 by performing an operation corresponding to "exp(2πjΔft·m(t))" of the Equation (1). The phase rotator 112 FSK-modulates the main signal data by multiplying the main signal data with the applied amount of phase rotation.

In addition, the frequency of the FSK signal, in other words, the frequency of m(t), may be a frequency sufficiently lower than the carrier frequency of the main optical signal. For example, the frequency of the FSK signal may be in an order of kilohertz (kHz), whereas the carrier frequency is in an order of gigahertz (GHz).

As illustrated in FIG. 3, the optical receiver 30 may include an optical band pass filter (BPF) 31, a photo detector or photo diode (PD) 32 and a path ID detector 33.

Since the FSK signal is superimposed on the main optical signal input to the optical BPF 31, the center frequency of an optical spectrum of the main optical signal is shifted between "+Δft" and "−Δft" in the frequency axis, as illustrated by a dotted frame 301. The center frequency of the optical spectrum of the main optical signal may be understood to correspond to the carrier frequency of the main optical signal.

Here, as illustrated by a dotted frame 302, the transmission center frequency (or wavelength, the same hereinafter) of the optical BPF 31 may be set to a frequency offset from the carrier frequency of the main optical signal to a high frequency side (or a low frequency side).

In addition, the transmission bandwidth of the optical BPF 31 may be set to a bandwidth transmitting a portion of the optical spectrum of the main optical signal. For example, the transmission bandwidth of the optical BPF 31 may be set to a bandwidth less than half of a bandwidth occupied by the optical spectrum of the main optical signal.

With such filter characteristic setting (which may be referred to as "filter setting" for the sake of convenience) discussed above, as illustrated by a dotted frame 303 in FIG. 3, the amount of light transmitting the optical BPF 31 varies according to a frequency shift of the main optical signal spectrum corresponding to the FSK signal.

Accordingly, a variation in optical power depending on the frequency shift of the main optical signal spectrum appears as output light of the optical BPF 31. In other words, the frequency shift of the main optical signal spectrum corresponding to the FSK signal is converted into amplitude-modulated (AM) light by the optical BPF 31.

The AM light is received in the PD 32 and converted into an electrical signal having an AM signal component corresponding to the power of the received light. The path ID identification circuit 33 can detect the path ID superimposed as the FSK signal on the main optical signal by identifying the AM signal component of the corresponding electrical signal.

The PD 32 may be sufficient if it can satisfy the reception sensitivity for the FSK signal component having a frequency sufficiently lower than the carrier frequency of the main optical signal, as described above. Therefore, the PD 32 may be a slow PD instead of a PD which is fast enough to satisfy the reception sensitivity of the main optical signal.

Thus, the optical receiver 30 can use the optical BPF 31 and the slow PD 32 to detect the path ID superimposed on the main optical signal with a relatively simple configuration.

However, the path ID may be superimposed on each of main optical signals having different wavelengths which are adjacent to each other (which may be referred to as "adjacent wavelengths") in a WDM optical signal.

Figure 4A:
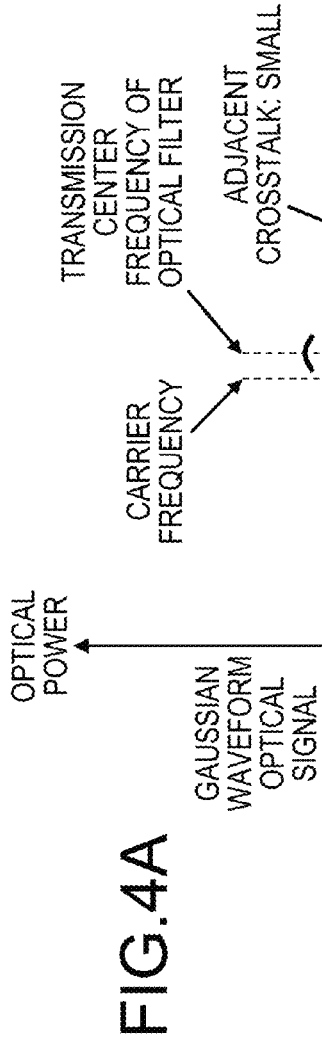
FIGS. 4A and 4B are views schematically illustrating a relationship between a carrier frequency of an optical signal and a transmission center frequency of an optical bandpass filter illustrated in FIG. 3, FIG. 4A illustrating the relationship for a main optical signal having a Gaussian waveform and FIG. 4B illustrating the relationship for an optical signal having a Nyquist waveform.

For example, as illustrated in FIG. 4A, if the main optical signal has a Gaussian waveform rather than a Nyquist waveform, a waveform of the main optical signal spectrum becomes dull as compared to the Nyquist waveform.

Therefore, although an offset of the transmission center frequency of the optical BPF 31 for the carrier frequency is small, the optical power transmitting the optical BPF 31 is likely to be greatly varied.

That is, the Gaussian waveform results in a small offset of the transmission center frequency of the optical BPF 31, which maximizes the amount of variation in the AM signal component obtained by the BPF 31.

In other words, in order to obtain the detection sensitivity of the AM signal component which is enough to detect the path ID, the offset of the transmission center frequency of the optical BPF 31 may be small.

Therefore, it is easy to adjust the offset of the transmission center frequency of the optical BPF 31 such that the FSK signal component superimposed on each of the main optical signals having the adjacent wavelengths is not mixed into the output of the optical BPF 31.

Accordingly, it is easy to avoid or suppress an FSK signal superimposed on a main optical signal having an adjacent wavelength from being cross-talked to a FSK signal superimposed on a main optical signal having a wavelength to be detected.

Figure 4B:
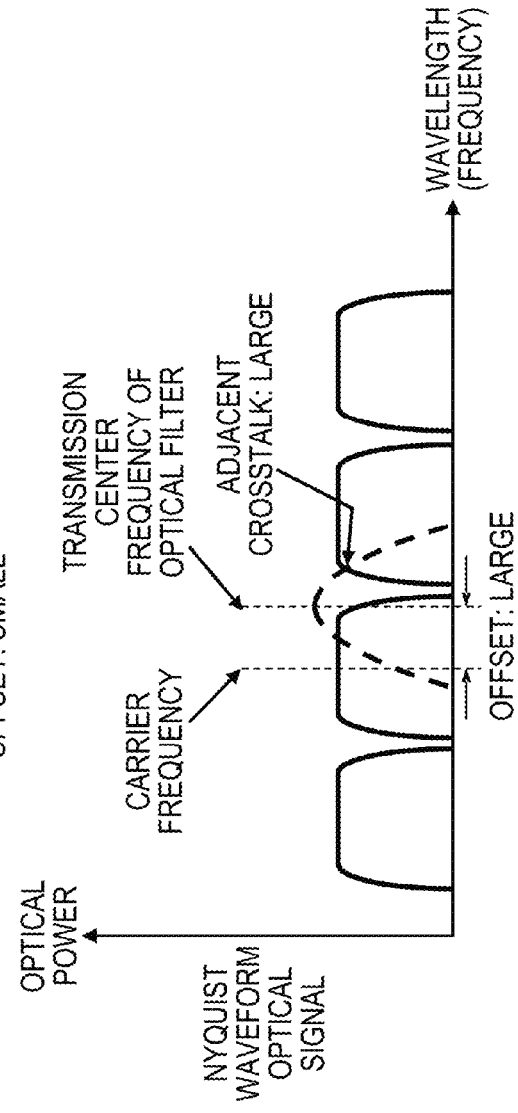

In contrast, for example, as illustrated in FIG. 4B, if a main optical signal has a Nyquist waveform, a waveform of the spectrum of the main optical signal is close to a rectangular wave, as compared to a Gaussian waveform. For example, the main optical signal having the Nyquist waveform is obtained by driving the optical modulator 124 according to a signal obtained by subjecting the main signal data to a Nyquist filtering by the digital signal processing.

Since the optical spectrum of the main optical signal having the Nyquist waveform becomes close to a rectangular wave and can be narrowed, it is possible to narrow a wavelength space in the transmission band of the WDM optical signal. Therefore, it is possible to increase a frequency use efficiency of the transmission band. A WDM optical signal having a narrow wavelength space may be referred to as a "super-channel."

Since the optical spectrum of the main optical signal having the Nyquist waveform is close to a rectangular wave, a sufficient variation in AM signal component does not appear on the output of the optical BPF 31 only by a little offsetting of the transmission center frequency of the optical BPF 31 from the carrier frequency.

Therefore, unless the offset of the transmission center frequency of the optical BPF 31 is larger than that for the Gaussian waveform, detection sensitivity of the AM signal component enough to detect the path ID cannot be obtained.

However, if the offset of the transmission center frequency of the optical BPF 31 is set to be larger than that for the Gaussian waveform, a crosstalk is likely to be increased since the FSK signal superimposed on the main optical signal is likely to be mixed into the output of the optical BPF 31.

If the crosstalk is excessively increased, there is a possibility that the FSK signal superimposed on a main optical signal having a wavelength to be detected cannot be correctly detected.

Therefore, one example of an optical receiver capable of correctly detecting an FSK signal even when a main optical signal spectrum on which the FSK signal is superimposed has a waveform close to a rectangular waveform such as a Nyquist waveform will be described below.

Figure 5:
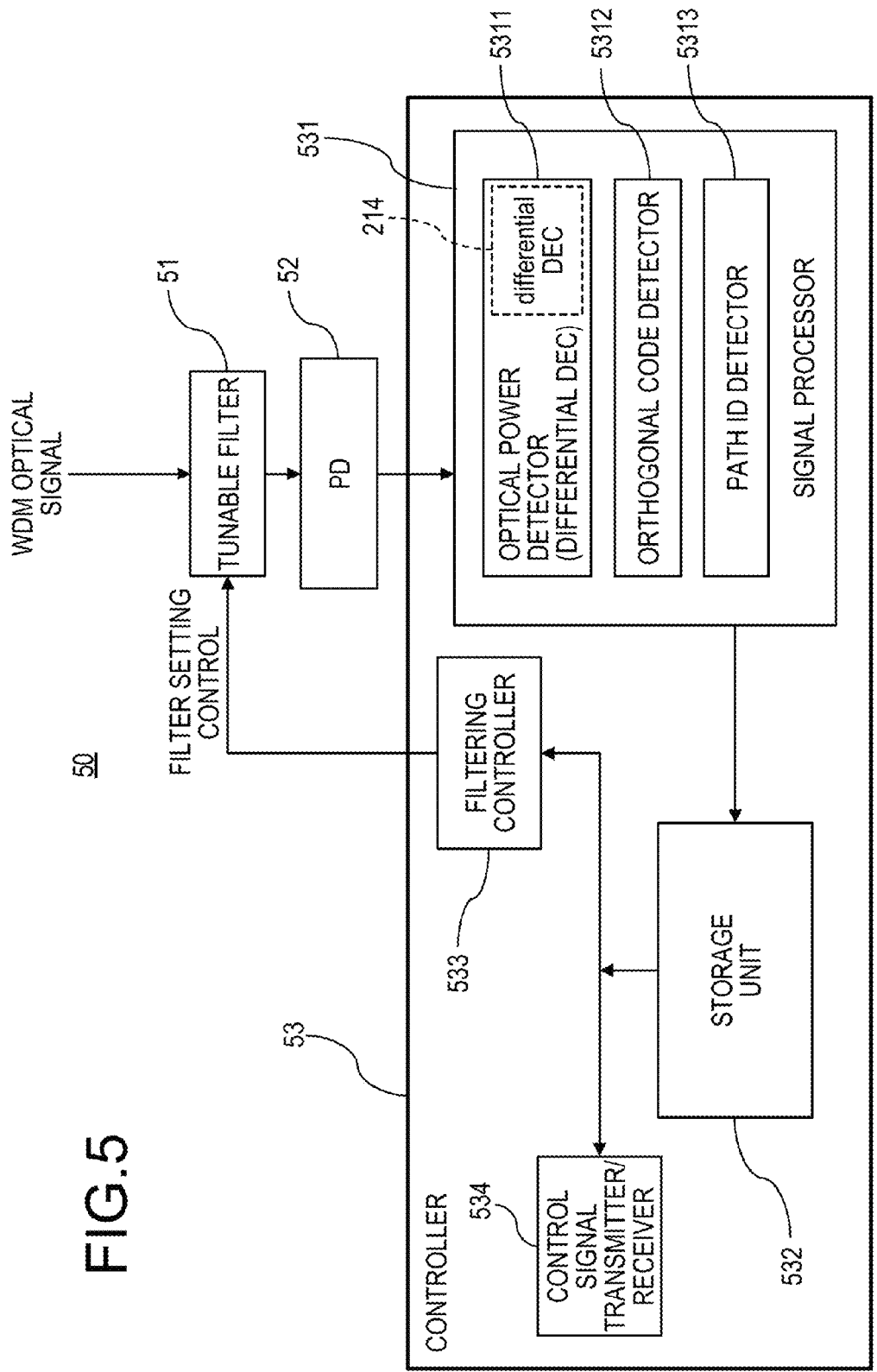
FIG. 5 is a block diagram illustrating an example of the configuration of an optical receiver according to one embodiment.

FIG. 5 is a block diagram illustrating an example of the configuration of an optical receiver according to one embodiment. The optical receiver 50 illustrated in FIG. 5 may be provided in one of the nodes 2 illustrated in FIGS. 1 and 2, and may, for example, include a tunable filter 51, a PD 52, and a controller 53.

For example, the controller 53 may include a signal processor 531, a storage unit 532, a filtering controller 533, and a control signal transmitter/receiver 534.

For example, the signal processor 531 may include an optical power detector 5311, an orthogonal code detector 5312, and a path ID detector 5313.

For example, the tunable filter 51 receives a WDM optical signal. The tunable filter 51 may be a tunable BPF having a variable transmission center frequency.

The transmission bandwidth of the tunable BPF 51 may be set to be equal to the above-mentioned transmission bandwidth of the optical BPF 31. For example, the transmission center frequency of the tunable BPF 51 may be controlled by the filtering controller 533.

The PD 52 receives light transmitted the tunable BPF 51 and outputs an electrical signal (e.g., a current signal) having the amplitude corresponding to the power of the received light. The current signal may be converted into a voltage signal, for example, by means of a trans-impedance amplifier (TIA) (not illustrated).

For example, an output signal of the PD 52 may be input to the signal processor 531 of the controller 53. For example, the signal processor 531 detects a path ID superimposed on a main optical signal as an FSK signal by detecting the power of the optical signal received in the PD 52 and a code of the coded FSK signal.

For example, an orthogonal coding may be applied to the coding of the FSK signal. One example of the orthogonal coding may include code division multiple access (CDMA) coding. An example of the configuration of an optical transmitter for subjecting the FSK signal superimposed on the main signal data to the orthogonal coding will be described later.

In the signal processor 531, for example, the optical power may be detected by the optical power detector 5311, and the orthogonal code of the orthogonally-coded FSK signal may be detected by the orthogonal code detector 5312. The path ID may be detected by the path ID detector 5313.

The data or information obtained by the signal processing in the signal processor 531 may be stored in the storage unit 532. The detection results by the detectors 5311 to 5313 may be included in the data or information stored in the storage unit 532. The storage unit 532 may be a flash memory, a hard disk drive (HDD), a solid state drive (SSD), or the like.

The filtering controller 533 controls the transmission center frequency of the tunable filter 51. For example, the transmission center frequency may be controlled by the NMS 3.

For example, the filtering controller 533 may set the transmission center frequency of the tunable filter 51 to a frequency corresponding to a wavelength of the FSK signal to be detected (which may be referred to as a "target wavelength" for the sake of convenience) and a wavelength between the target wavelength and an adjacent wavelength.

The adjacent wavelength may be shorter or longer than the target wavelength. The target wavelength is one example of a "first wavelength." An adjacent wavelength shorter than the target wavelength is one example of a "second wavelength," and an adjacent wavelength longer than the target wavelength is one example of a "third wavelength."

A "main optical signal having the first wavelength" is one example of a "first optical signal," a "main optical signal having the second wavelength" is one example of a "second optical signal," and a "main optical signal having the third wavelength" is one example of a "third optical signal."

In FIG. 6A, for example, assuming that a target wavelength (sub-carrier) of four wavelengths is a sub-carrier c, the transmission center frequency of the tunable filter 51 may be set to a frequency between the sub-carrier c and an adjacent sub-carrier b at a short wavelength side. This setting is one example of "first filter setting."

The frequency between the sub-carriers b and c, to which the transmission center frequency of the tunable filter 51 is set, may be a frequency which is intermediate or substantially intermediate between the sub-carriers b and c (which may be referred to as an "intermediate frequency").

When the transmission center frequency of the tunable filter 51 is set to the intermediate frequency between the sub-carriers b and c, the power of the FSK signal component which is transmitted through the tunable filter 51 and received in the PD 52 can be equalized between the sub-carriers b and c. Therefore, it is possible to equalize the detection sensitivity of the FSK signal power between the sub-carriers b and c.

An AM signal component corresponding to the FSK signal component superimposed in each of the sub-carriers b and c is detected from the output signal of the PD 52, for example, in the optical power detector 5311. In addition, the orthogonal code of the orthogonally-coded FSK signal is demodulated and detected in the orthogonal code detector 5312.

Based on the orthogonal code detected in the orthogonal code detector 5312, the signal processor 531 can separate AM signal components corresponding to two FSK signal components, which are detected in the optical power detector 5311.

Here, although the two AM signal components can be separated based on the orthogonal code, it is unclear whether or not one of the separated AM signal components is an AM signal component related to the target sub-carrier c.

Therefore, for example, as illustrated in FIG. 6B, the filtering controller 533 may set the transmission center frequency of the tunable filter 51 between the target sub-carrier c and an adjacent sub-carrier d at a high frequency side of the sub-carrier c. This setting is one example of "second filter setting."

In the example of FIG. 6B as well, the transmission center frequency of the tunable filter 51 may be an "intermediate frequency" between the sub-carriers c and d.

The setting of transmission center frequency to the "intermediate frequency" makes it possible to equalize the power of the FSK signal component received in the PD 52 between the sub-carriers c and d. Therefore, it is possible to equalize the detection sensitivity of the FSK signal component power between the sub-carriers c and d.

Thus, in the same way as FIG. 6A, the AM signal components corresponding to the FSK signal components superimposed respectively on the main optical signals of the two sub-carriers c and d are detected in the optical power detector 5311, and the orthogonal code is detected in the orthogonal code detector 5312.

By comparing the AM signal components received and detected in the filter setting illustrated in FIG. 6A and the filter setting illustrated in FIG. 6B, it is possible to identify the AM signal components of the target sub-carrier c received and detected in both filter settings.

For example, the comparison and identification of the AM signal components may be performed by the path ID detector 5313. For example, the data of the AM signal components used for the comparison are stored in the storage unit 532.

Based on the identified AM signal components, the path ID detector 5313 can detect a path ID superimposed on the target sub-carrier c.

In order to reduce a crosstalk between adjacent sub-carriers, it is common that filter characteristics of suppressing transmission of a signal component of an unnecessary sub-carrier which acts as a noise component for an FSK signal of the target subcarrier are considered.

However, it is difficult to implement filter characteristics such as sufficiently suppressing unnecessary sub-carrier signal components for a main optical signal spectrum having a wavelength space narrowed by application of a Nyquist waveform.

In this embodiment, as described above, the filter setting of the tunable filter 51 is controlled such that even a signal component causing a crosstalk is received in the PD 52 through the tunable filter 51.

On this account, the filter characteristics of the tunable filter 51 may not suppress adjacent sub-carrier signal components, and the characteristics and specifications required for the tunable filter 51 can be mitigated.

In addition, for example, the control signal transmitter/receiver 534 illustrated in FIG. 5 exchanges a control signal with the NMS 3. A control signal received from the NMS 3 may contain information to be used to control the filter setting of the tunable filter 51. A control signal transmitted to the NMS 3 may contain a path ID detected in the path ID detector 5313.

(Example of Operation of Optical Receiver 50)

Figure 7A:
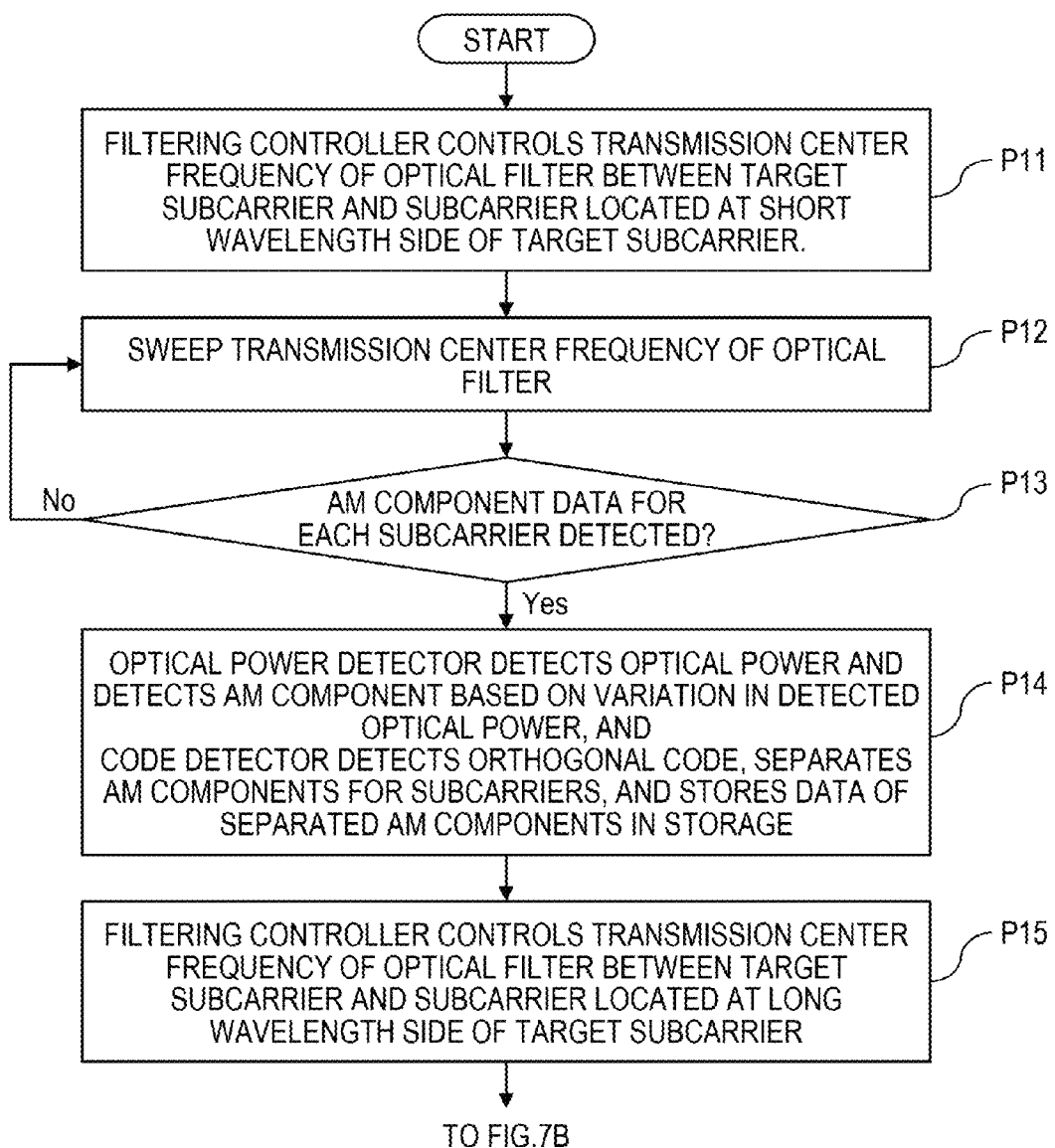
FIGS. 7A and 7B are a flow chart illustrating an example of the operation of the optical receiver illustrated in FIG. 5.
Figure 7B:
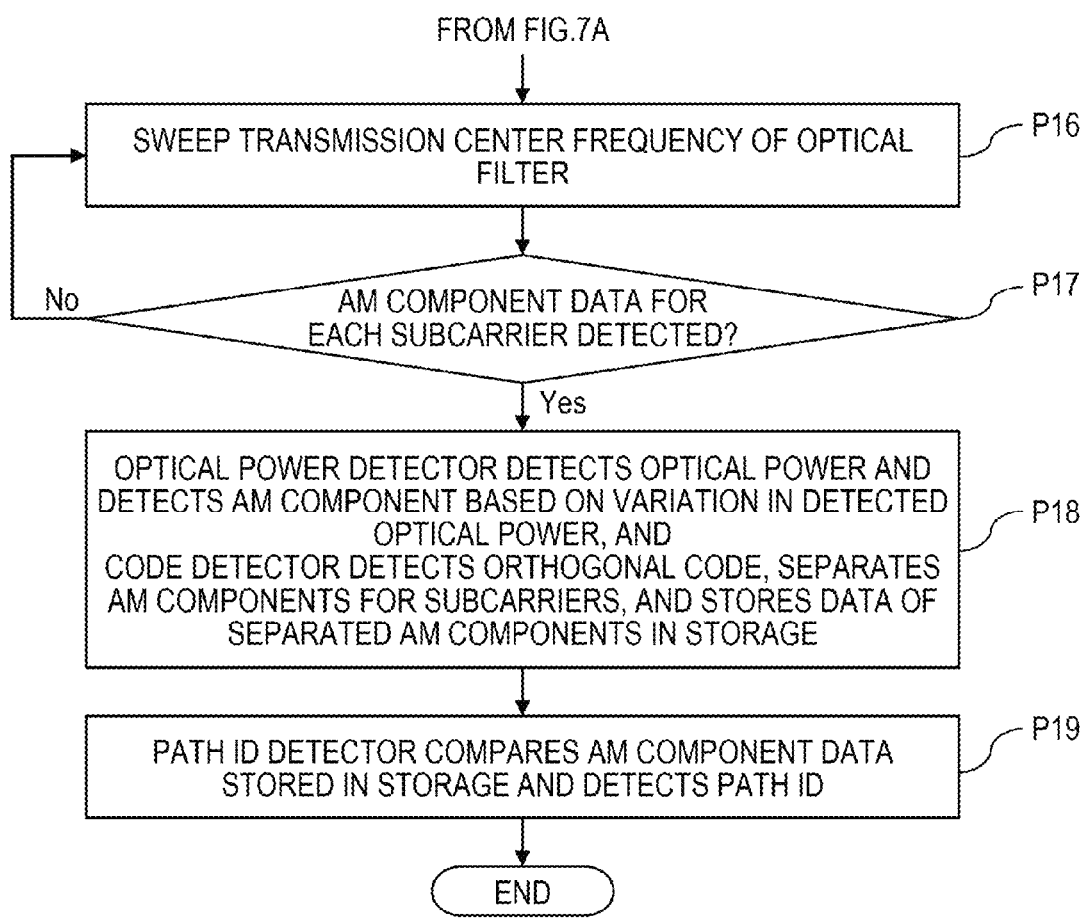

Next, an example of the operation of the above-described optical receiver 50 will be described with reference to FIGS. 7A and 7B. For example, according to a control signal from the NMS 3, the optical receiver 50 sets the transmission center frequency of the tunable filter 51 to the intermediate frequency between the sub-carrier c and the sub-carrier b, as illustrated in FIG. 6A, by means of the filtering controller 533 (Operation P11).

Here, the filtering controller 533 may determine whether or not a path ID has been detected in the signal processor 531 for both of the target sub-carrier c and the adjacent sub-carrier b.

For example, the determination may be made through a monitoring by the filtering controller 533 whether AM signal components separated respectively based on orthogonal codes for the sub-carriers b and c are respectively detected by the optical power detector 5311 and the orthogonal code detector 5312.

The filtering controller 533 may sweep the transmission center frequency of the tunable filter 51 (Operation P12 from a No route of Operation P13) until the AM signal component data related to the sub-carriers b and c are detected (i.e., until the determination is made as "Yes" in Operation P13). The sweep control of the tunable filter 51 illustrated in Operation P12 and Operation P13 may be unnecessary settings.

When it is determined to be "Yes" in Operation P13, the AM signal component data related to the sub-carriers b and c, which are respectively separated and detected from the output signal of the PD 52 by the optical power detector 5311 and the orthogonal code detector 5312, are stored in the storage unit 532 (Operation P14).

Next, as illustrated in FIG. 6B, the filtering controller 533 sets the transmission center frequency of the tunable filter 51 to the intermediate frequency between the sub-carrier c and the sub-carrier d (Operation P15).

For the sub-carriers c and d, in the same way as Operation P13, the filtering controller 533 may determine whether or not both AM signal component data are separated and detected by the optical power detector 5311 and the orthogonal code detector 5312 (Operation P17).

The filtering controller 533 may sweep the transmission center frequency of the tunable filter 51 (Operation P16 from a No route of Operation P17) until the AM signal component data related to the sub-carriers c and d are detected (i.e., until the determination is made as "Yes" in Operation P17). The sweep control of the tunable filter 51 illustrated in Operation P16 and Operation P17 may be unnecessary settings.

When it is determined to be "Yes" in Operation P17, the AM signal component data related to the subcarriers c and d, which are respectively separated and detected from the output signal of the PD 52 by the optical power detector 5311 and the orthogonal code detector 5312, are stored in the storage unit 532 (Operation P18).

A set of the above-described Operations P11 to P13 and a set of the above-described Operations P15 to P17 may be performed in reverse. For example, the optical receiver 50 may perform Operations P11 to P13 after performing Operations P15 to P17. In other words, one of the filter settings illustrated in FIGS. 6A and 6B may be performed earlier than the other.

Alternatively, the filter settings illustrated in FIGS. 6A and 6B may be performed in parallel by means of respective optical filters. In other words, the set of Operations P11 to P13 and the set of Operations P15 to P17 may be performed in parallel by means of two respective optical filters.

When the AM signal component data in the filter settings illustrated in FIGS. 6A and 6B are detected and stored in the storage unit 532, for example, the path ID detector 5313 reads the AM signal component data detected in the filter settings from the storage unit 532.

The path ID detector 5313 detects a path ID of the target sub-carrier c by comparing the read AM signal component data (Operation P19).

The detected path ID may be stored in the storage unit 532. In addition, the detected path ID may be transmitted to the NMS 3 by the control signal transmitter/receiver 534. Thus, the NMS 3 can identify the path ID.

As described above, with the above-described optical receiver 50, even when a path ID is superimposed on each of main optical signals having different wavelengths as an FSK signal, it is possible to correctly detect an FSK signal superimposed on a main optical signal having a target wavelength, which can result in an improvement of the reception characteristics of the FSK signal.

(Example of Configuration of Optical Transmitter 10)

Next, an example of the configuration of an optical transmitter 10 capable of orthogonally-coding an FSK signal superimposed on a main optical signal will be described with reference to FIG. 8.

Figure 8:
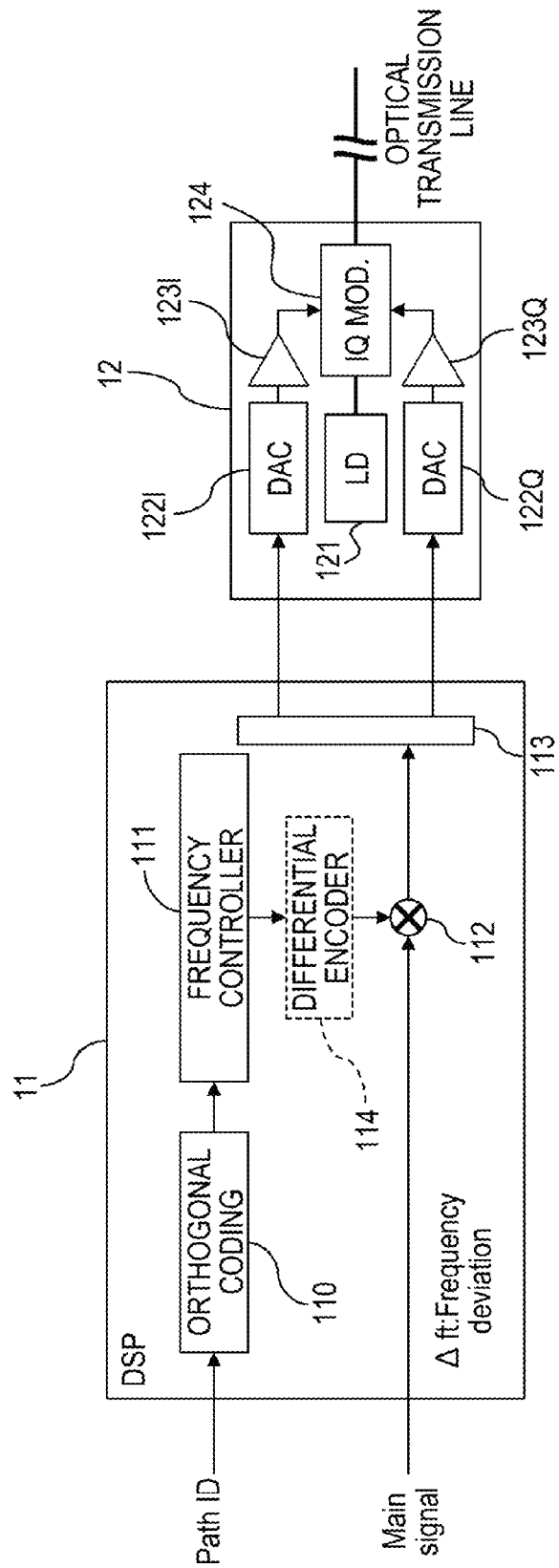
FIG. 8 is a block diagram illustrating an example of the configuration of an optical transmitter according to one embodiment.

The optical transmitter 10 illustrated in FIG. 8 is different from the configuration illustrated in FIG. 3 in that the DSP 11 further includes an orthogonal coder 110. In addition, the optical transmitter 10 illustrated in FIG. 8 may include a plurality of nodes 2 in association with optical signals having different wavelengths which are wavelength-multiplexed in a WDM optical signal.

For example, the orthogonal coder 110 orthogonally-codes path IDs superimposed on main signal data and inputs them to the frequency controller 111 described above with respect to FIG. 3. Based on the orthogonally-coded path IDs, the frequency controller 111 controls the frequency (in other words, phase rotation) of the main signal data. The term "orthogonal coding" may be interchangeably used with "orthogonal modulation" which is one example of a digital modulation.

One unlimited example of the orthogonal coding may include CDMA coding. The orthogonally-coded path IDs have an orthogonal relationship with a path ID superimposed on a main optical signal of an adjacent sub-carrier.

For example, path IDs superimposed respectively on main optical signals of the sub-carriers b to c illustrated in FIGS. 6A and 6B have an orthogonal relationship as these path IDs are orthogonally coded by orthogonal codes which are orthogonal to each other.

Therefore, when the path IDs are orthogonally-decoded (which may be referred to as "orthogonally-modulated"), it is possible to separate a path ID superimposed on a target sub-carrier and a path ID superimposed on an adjacent sub-carrier from each other, as described previously.

In addition, a sub-carrier on which an orthogonally-coded path ID is superimposed may be limited to a portion of sub-carriers including in a WDM optical signal. For example, path IDs may be orthogonally-coded only for three sub-carriers adjacent around the target sub-carrier.

With a limitation to a sub-carrier for which a path ID is to be orthogonally-coded, it is possible to suppress the reduction in a transmission rate of the WDM optical signal as compared to a case where path IDs for all subcarriers are orthogonally-coded. Therefore, for example, it is possible to suppress the reduction in a monitoring efficiency of optical paths based on path IDs.

In addition, as illustrated by a dotted line in FIG. 8, the DSP 11 may further include a differential encoder 114 by the digital signal processing.

For example, the differential encoder 114 differentially-codes information indicating an amount of phase rotation applied from the frequency controller 111 to the phase rotator 112. In other words, a difference between frequency deviations of an FSK signal superimposed on the main signal data is coded.

Therefore, in the optical receiver 50, when an FSK signal component is differentially-decoded, it is possible to match positive and negative signs of an AM signal component appearing on the output signal of the PD 52 depending on the FSK signal components in the filter setting of FIG. 6A and the filter setting of FIG. 6B. The term "differential-decoding" may be interchangeably used with "delay detection."

From the matching of signs of AM signal components, for example, since the positive and negative signs of the AM signal components may not be inverted depending on the filter setting of the tunable filter 51 in the comparing process of the AM signal components by the path ID detector 5313, it is possible to simplify the path ID detecting process.

Figure 9:
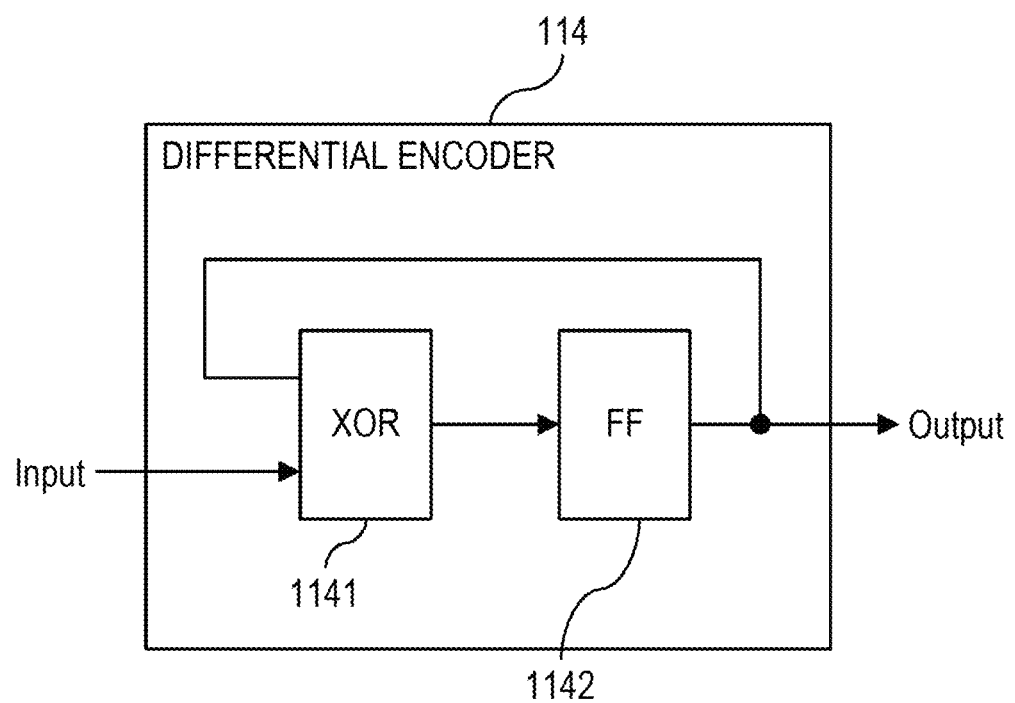
FIG. 9 is a block diagram illustrating an example of the configuration of a differential encoder illustrated in FIG. 8.
Figure 10:
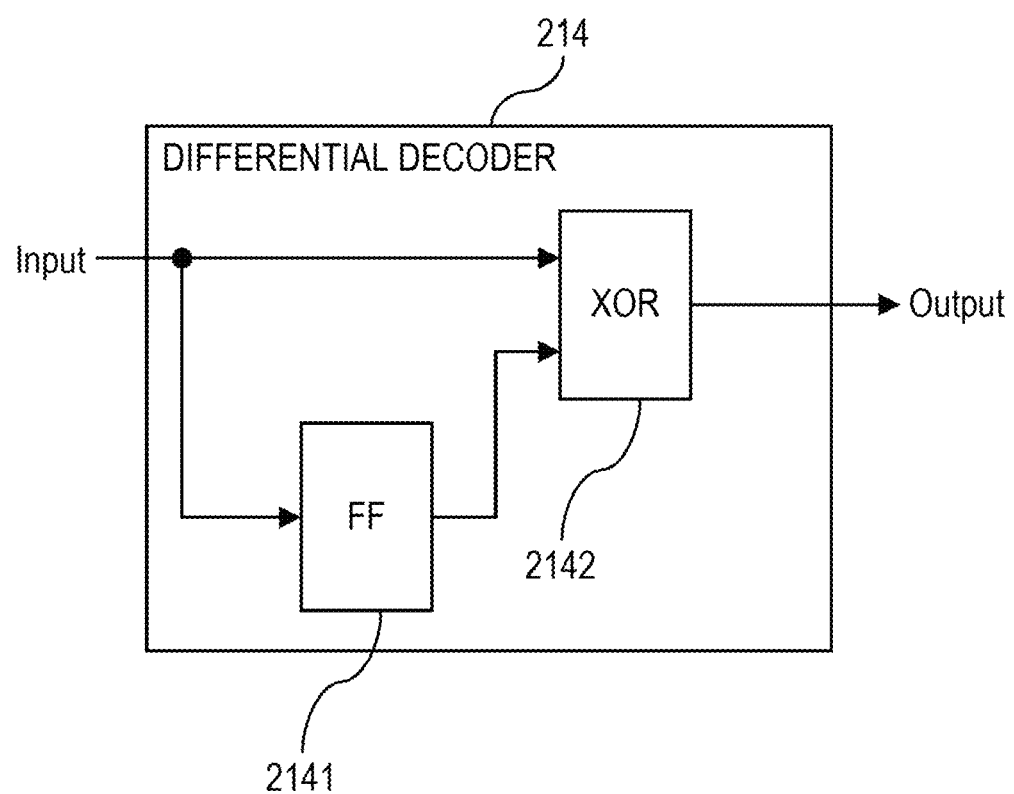
FIG. 10 is a block diagram illustrating an example of the configuration of a differential decoder corresponding to the differential encoder illustrated in FIG. 9.

FIG. 9 illustrates an example of the configuration of the differential encoder 114, and FIG. 10 illustrates an example of the configuration of a differential decoder 214 corresponding to the differential encoder 114. For example, the differential decoder 214 illustrated in FIG. 10 may be included in the optical power detector 5311 illustrated in FIG. 5.

The differential encoder 114 illustrated in FIG. 9 may include an exclusive OR (XOR) circuit 1141 and a flip-flop (FF) 1142. The FF 1142 may be referred to as a delay circuit 1142.

The XOR circuit 1141 performs an XOR operation for a current input signal from the frequency controller 111 and a result of previous operation of the XOR circuit 1141 which is delayed in the FF 1142. For example, a delay time by the FF 1142 may be one symbol time. An output of the FF 1142 is applied to the phase rotator 112 as a differential code.

In the meantime, for example, the differential decoder 214 illustrated in FIG. 10 may include a delay circuit (FF) 2141 and an XOR circuit 2142.

The XOR circuit 2142 performs an XOR operation for a previous signal obtained by delaying an input signal from the PD 52, for example, by one symbol time in the FF 2141 and a current input signal from the PD 52.

Thus, an AM signal component corresponding to an FSK signal component differentially-encoded in the differential encoder 114 is decoded.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical receiver comprising:
   a tunable filter configured to partially transmit a wavelength-multiplexed optical signal including a first optical signal having a first wavelength, a second optical signal having a second wavelength adjacent to a short wavelength side of the first wavelength, and a third optical signal having a third wavelength adjacent to a long wavelength side of the first wavelength, each of the first to third optical signals being superimposed with a frequency-modulated signal indicating a path ID of an optical path;
   a photodetector configured to receive the frequency-modulated signal transmitted through the tunable filter and convert the frequency-modulated signal into an electrical signal; and
   a controller configured to control an overall operation of the optical receiver and including a filtering controller, an optical power detector, an orthogonal code detector, and a path ID detector,
   wherein the filtering controller changes a transmission center frequency of the tunable filter such that
   the tunable filter is set for a first filter setting in which the transmission center frequency is set between the first optical signal and the second optical signal so that portions of only the first optical signal and the second optical signal transmit through the tunable filter, or for a second filter setting in which the transmission center frequency is set between the first optical signal and the third optical signal so that portions of only the first optical signal and the third optical signal transmit through the tunable filter,
   the optical power detector detects an amplitude-modulated signal component of the frequency-modulated signal which has been converted into the electrical signal at the photodetector for each of the first optical signal and the second optical signal for the first filter setting and for each of the first optical signal and the third optical signal for the second filter setting,
   the orthogonal code detector detects an orthogonal code of the frequency-modulated signal which has been converted into the electrical signal at the photodetector for each of the first and second optical signals for the first filter setting and for each of the first and third optical signals for the second filter setting, and
   the path ID detector detects the path ID of the first optical signal by comparing the amplitude-modulated signal component for each of the first and second optical signals for the first filter setting and for each of the first and third optical signals for the second filter setting.

2. The optical receiver according to claim 1, wherein the frequency-modulated signal superimposed on each of the first to third optical signals is orthogonally-coded by the orthogonal code, and wherein the optical power detector identifies an amplitude-modulated signal corresponding to the frequency-modulated signal superimposed on the first optical signal based on the orthogonal code.

3. The optical receiver according to claim 1, wherein the filtering controller sweeps the transmission center frequency on each of the first filter setting and the second filter setting.

4. The optical receiver according to claim 1, wherein the frequency-modulated signal superimposed on each of the first to third optical signals is differentially-coded, and wherein the optical power detector detects the frequency-modulated signal superimposed on the first optical signal by differentially-decoding the amplitude-modulated signal detected on each of the first filter setting and the second filter setting.

5. A superimposed signal detecting method comprising:
   receiving, at a tunable filter, a wavelength-multiplexed optical signal including a first optical signal having a first wavelength, a second optical signal having a second wavelength adjacent to a short wavelength side of the first wavelength, and a third optical signal having a third wavelength adjacent to a long wavelength side of the first wavelength, each of the first to third optical signals being superimposed with a frequency-modulated signal indicating a path ID of an optical path;
   setting a transmission center frequency of the tunable filter for a first filter setting in which the transmission center frequency is set between the first optical signal and the second optical signal so that portions of only the first optical signal and the optical second signal transmit through the tunable filter, and for a second filter setting in which the transmission center frequency is set between the first optical signal and the third optical signal so that portions of only the first optical signal and the third optical signal transmit through the tunable filter;
   partially transmitting the wavelength-multiplexed optical signal through the tunable filter for each of the first filter setting and the second filter setting thereby obtaining the frequency modulated signal for each of the first and second optical signals of the first filter setting and for each of the first and third optical signals of the second filter setting;
   converting, by a photodetector, the frequency modulated signal into an electrical signal for each of the first and second optical signals of the first filter setting and for each of the first and third optical signals of the second filter setting;
   detecting, by an optical power detector, an amplitude-modulated signal component of the frequency-modulated signal which has been converted into the electrical signal at the photodetector for each of the first optical signal and the second optical signal for the first filter setting and for each of the first optical signal and the third optical signal for the second filter setting;
   detecting, by an orthogonal detector, an orthogonal code of the frequency-modulated signal which has been converted into the electrical signal at the photodetector for each of the first and second optical signals for the first filter setting and for each of the first and third optical signals for the second filter setting; and
   comparing, by a path ID, the amplitude-modulated signal component for each of the first and second optical signals for the first filter setting and for each of the first and third optical signals for the second filter setting, thereby detecting the path ID.

* * * * *